H. G. COYKENDALL.
APPARATUS FOR PROCESSING FRUIT.
APPLICATION FILED OCT. 29, 1909.
985,979.
Patented Mar. 7, 1911.
2 SHEETS—SHEET 2.
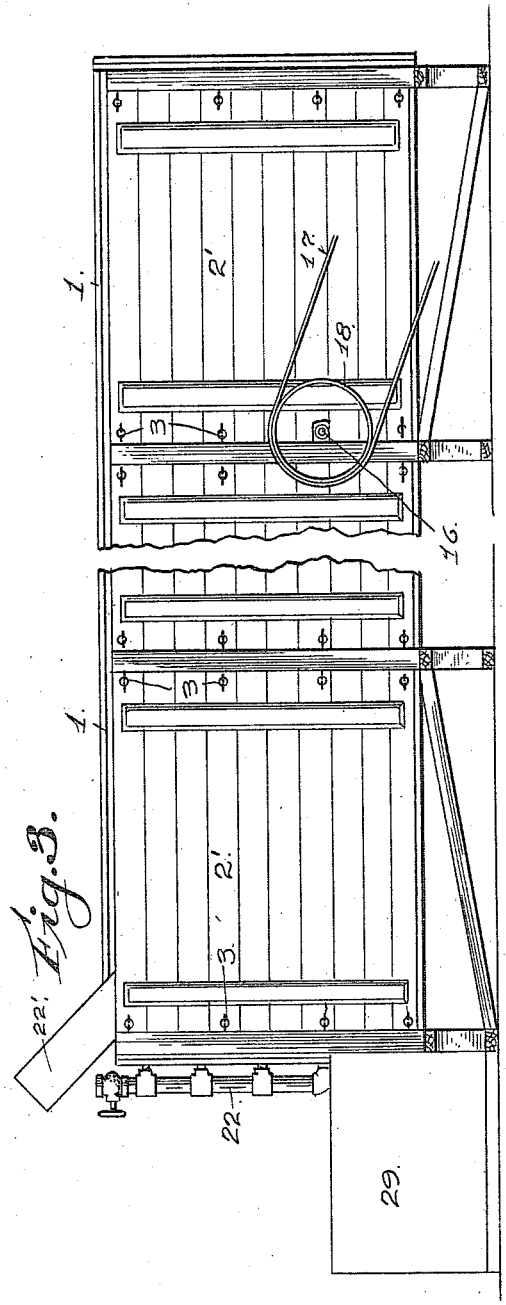
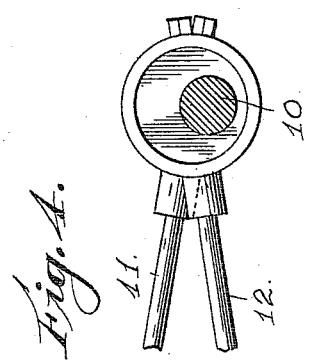

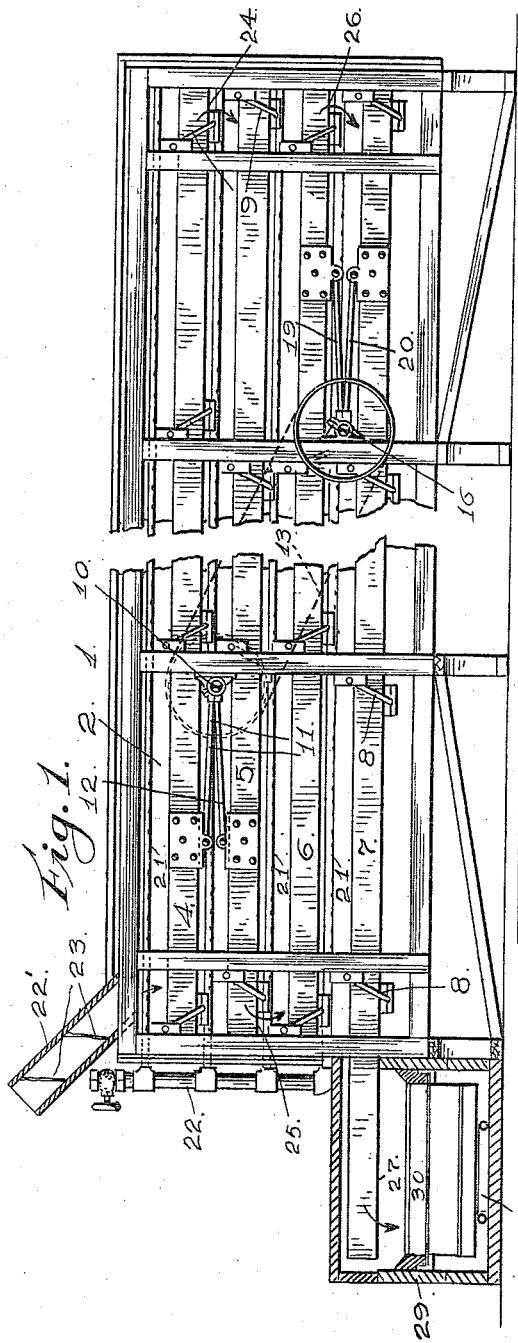

UNITED STATES PATENT OFFICE.

HORATIO G. COYKENDALL, OF SAN JOSE, CALIFORNIA.

APPARATUS FOR PROCESSING FRUIT.

985,979.  Specification of Letters Patent.  Patented Mar. 7, 1911.

Application filed October 29, 1909.  Serial No. 525,381.

*To all whom it may concern:*

Be it known that I, HORATIO G. COYKENDALL, a citizen of the United States, residing at San Jose, in the county of Santa Clara and State of California, have invented certain new and useful Improvements in Apparatus for Processing Fruit, of which the following is a specification.

The hereinafter described invention is designed for the treatment of fruit generally, but more particularly dried fruit, such as prunes, preparatory to placing the same onto the market; the object of the invention being to thoroughly clean the fruit and enhance the appearance thereof, so as to place the same in an attractive condition.

For successfully carrying out the object desired, it is essential that the entire surface of the fruit be subjected to the action of cleaning jets which act upon each individual piece of fruit as propelled or conveyed through the processing apparatus.

To this end, the invention comprises means for propelling or conveying the fruit to be treated through the apparatus and maintaining the same throughout its course of travel in an agitated condition, the agitation given to the fruit being sufficient to turn or roll the fruit over and over, so as to expose the entire surface thereof to the action of the cleaning jets.

To comprehend the invention reference should be had to the accompanying sheets of drawings, wherein—

Figure 1 is a longitudinal sectional view of the processing apparatus. Fig. 2 is a front elevation, partly broken, the end wall of the washing attachment being removed. Fig. 3 is a side elevation partly broken away. Fig. 4 is a detail view in elevation of the actuating means for two of the companion shaking tables.

In the drawings, the numeral 1 is used to indicate a suitable box or casing forming a steam tight chamber 2, which is provided with a series of removable side sections 2', which are united to the said box by the screw-bolts 3. Within the steam chamber is arranged a series of longitudinally disposed shaking tables 4, 5, 6, 7, which tables are individually suspended within the steam box 1 by means of the link connections 8—9. The upper table 4 is actuated from a crank shaft 10 by means of the pitman connections 11; while the table 5 is driven from said crank-shaft 10, by means of the pitman connections 12, the pitman connections being so disposed as to impart a rearward jolt to the shaking table 4 and a forward jolt to the table 5.

The crank shaft 10 is driven by a power transmitting belt 13, which works over a pulley wheel 14 on the shaft 10 and a pulley wheel 15 on the drive crank shaft 16, which shaft is driven from any suitable source of power by the drive belt 17, which works over the drive pulley 18 on the said crank shaft 16. This shaft actuates the shaking tables 6 and 7, it being connected thereto respectively by the pitmans 19—20, which are so disposed relative to the crank shaft 16 as to impart a rearward jolting motion to the table 6, and a forward jolting action to the lowermost table 7.

Above each of the shaking tables is arranged, preferably, a plurality of perforated steam pipes 21, which receive steam or other cleaning fluid, as for instance water, under pressure from the main supply pipe 22, located outside of the processing apparatus. The lower or inner end of each steam pipe, preferably, is closed, so that the steam forced therein under pressure, is forcibly ejected through the perforations of the said pipes downwardly onto the fruit being conveyed through the apparatus, and serves to soften the fruit and loosen the dirt accumulation on the outer skin thereof, the jet streams having a cutting action for the loosened dirt.

The material to be treated is delivered into the processing apparatus from an inclined, closed, feed chute 22', entering therein at the upper forward end portion thereof, so as to deliver the fruit onto the surface of the upper shaking tables 4, of the series of tables, the steam within the apparatus being trapped by means of the canvas flaps 23 hung within the closed feed chute 22'. As the fruit falls onto the first of the series of shaking tables or carriers, the same, due to the jolting action or movement thereof, is conveyed rearwardly toward its discharge end, and during its course of travel the fruit is maintained in an agitated condition, so that various portions of its outer surface is subjected to the action of the jet streams playing onto the same. When the material under treatment reaches the discharge opening 24 of the table 4, the same falls onto the shaking table 5, which, by reason of the motion thereof, gradually conveys the fruit toward its forward end, the fruit being turned over and over during such travel and the exposed surface subjected to the action of the jet streams issuing from the perforated pipes arranged above the said table. From the table 5 the fruit falls through the discharge opening 25 onto the table 6, which conveys the same in an agitated condition toward the inner end thereof, the fruit falling from the said table through its discharge opening 26 onto the shaking table 7, the motion of which gradually forces the same forwardly toward its discharge end. During the travel of the fruit in an agitated condition over the surfaces of the tables 6 and 7, the same is exposed to the action of the jet streams playing thereon. By the time the fruit has reached the discharge end of the shaking table or carrier 7, the lowermost one of the series, the jets will have found access to the entire surface of each individual piece of the fruit being treated.

A series of horizontally disposed shaking tables or carriers for the fruit is illustrated and described, preference being given to four such tables. However, the number of tables employed is immaterial, for a single shaking carrier for the fruit, if of sufficient length, may be employed.

While a washing of the treated fruit is believed to be unnecessary after the subjection thereof to the jet streams, still, to insure perfect cleanliness of the fruit for freeing the same of such material as may be picked up and adhere thereto during its travel through the processing apparatus, the treated fruit passing from the shaking table 7 through the discharge opening or outlet 27, falls into a body of water, preferably maintained heated by the steam coil 28, contained within the closed wash tank 29, into which the discharge end of the shaking table or carrier 7 projects. The fruit deposited into the wash box or tank 29, falls onto an endless traveling draper 30, which conveys the same from within the said wash tank to a suitable place of deposit. Where the draper rises out of the wash tank, the partition wall 31 extends into the water, to close the outlet opening for trapping the steam within the processing apparatus. Such steam condensation as may take place within the steaming chamber of the apparatus, escapes through the trapped outlet 32.

The fruit as passed through the apparatus is not only individually treated and the entire surface exposed to the jet streams, but each piece of fruit is substantially uniformly processed, thus all fruit discharged from the apparatus will be found uniform in its appearance, which is a decided advantage when the fruit is placed onto the market.

The described apparatus may be used to advantage in connection with the processing of raisins, to prepare the same for passing through the mechanism for removing the seeds thereof, inasmuch as the treatment not only removes the dirt from the fruit, but softens the skin thereof so as to be easily perforated by the teeth of the seeding machinery.

It is obvious that heated air may be delivered into the perforated pipes 21, and heated air jets thus forced onto green fruit and the same dried while passed through the apparatus in a heated condition, in which case the tank 29 may be employed as a superheater. The apparatus may thus be successfully used as a drier for green fruit.

Having thus described the invention what is claimed as new and desired to be protected by Letters Patent is:—

1. An apparatus for the described purpose, the same comprising a closed chamber, a plurality of carriers arranged therein for successively receiving the fruit to be processed, a feed chute for delivering fruit onto one of the fruit carriers, devices for imparting opposite shaking movements to successive carriers for maintaining the fruit passing thereover in an agitated condition, and means adjacent the carriers for ejecting jet streams onto the traveling fruit, a washing tank arranged to receive the treated fruit, and a heater for said tank.

2. In an apparatus for processing dried fruit, the combination with a steam tight chamber through which the fruit is passed, a washing tank communicating therewith, a plurality of shaking carriers mounted within the steam chamber, the lowermost of said shaking carriers discharging its fruit into the washing tank, a feed device for delivering fruit onto the uppermost of the shaking carriers, means for imparting a jolting motion to the shaking carriers, of perforated pipes adjacent the table for directing jets of steam onto the fruit passing over the carriers, means for supplying steam under pressure to said pipes, and a draper within the washing tank for receiving the processed fruit and removing the same.

3. In an apparatus of the character described, the combination of a plurality of superimposed oppositely movable shaking carriers, an inclosing casing therefor having an opening at one end adjacent the bottom thereof, a washing tank having an opening registering with said opening in the casing, and the lowermost carrier at its outlet end being extended to project into the opening of the washing tank, and means for supplying steam to the casing.

4. In an apparatus of the character described, the combination of a closed chamber, means for admitting steam therein, a washing tank below the closed chamber and communicating with the latter, shaking carriers within the steam chamber, the lowermost of said carriers discharging its fruit into the washing tank, a wall projecting downwardly from the steam chamber into the washing tank, and a feed device within the washing tank adapted to deliver the fruit from within the tank to a point without the same, and said feed device passing closely to said wall as and for the purpose described.

5. In an apparatus of the character described, the combination of a plurality of superimposed shaking carriers, an inclosing casing therefor having an opening in one end adjacent the bottom thereof, a washing tank having an opening registering with said opening in the casing, and the lowermost carrier at its outlet end being extended to project into the opening of the washing tank, means for supplying steam to the casing, and a delivery carrier in said washing tank below the projecting end of the lower carrier of the casing, substantially as and for the purpose described.

In testimony whereof I have signed my name to this specification in the presence of two subscribing witnesses.

HORATIO G. COYKENDALL.

Witnesses:
R. C. HOGG,
F. E. COYKENDALL.

Copies of this patent may be obtained for five cents each, by addressing the "Commissioner of Patents, Washington, D. C."